Figure 1:
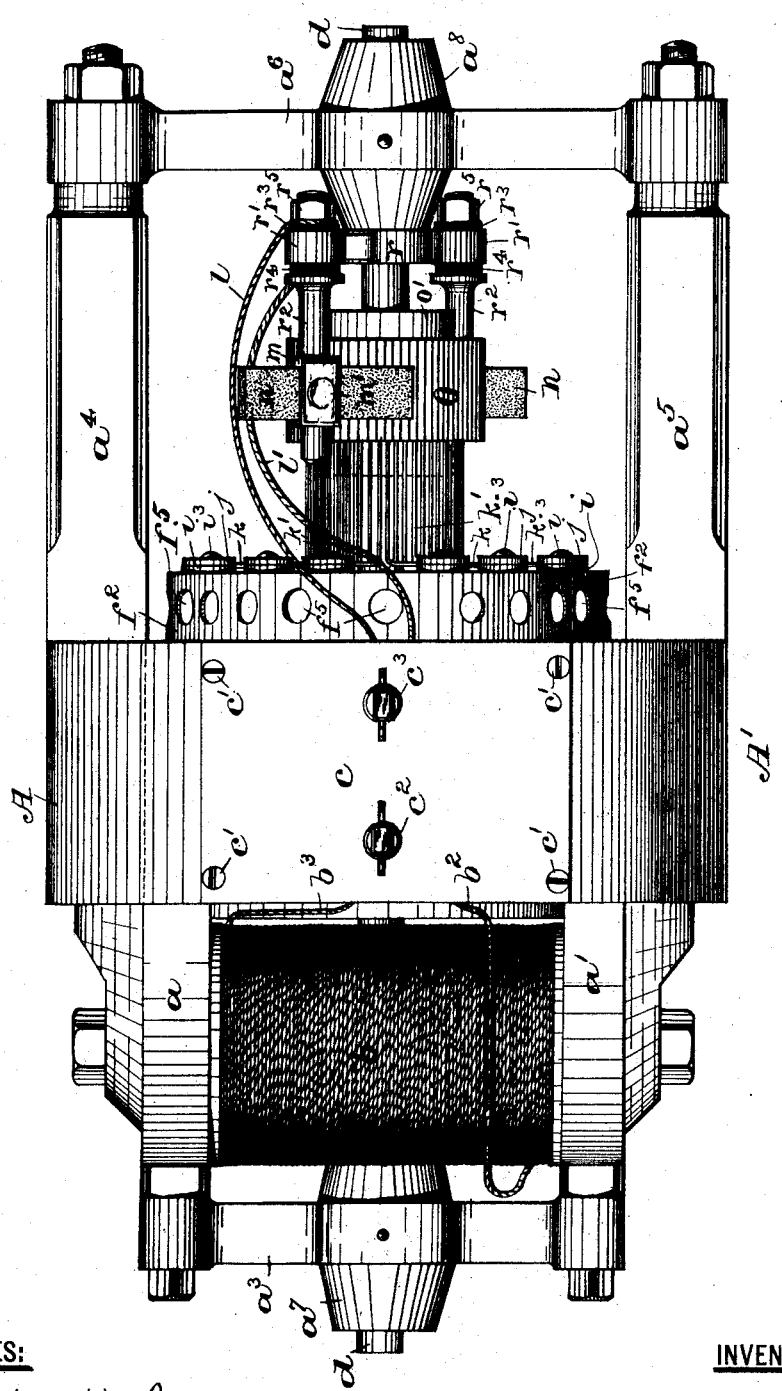

(No Model.) 7 Sheets—Sheet 1.

F. A. FELDKAMP.
DYNAMO ELECTRIC MACHINE.

No. 506,774. Patented Oct. 17, 1893.

WITNESSES:
Wm. H. Camfield Jr.
B. Mortimer Trusdell.

INVENTOR:
Fritz A. Feldkamp,
BY Fred. C. Fraentzel, ATT'Y.

(No Model.) 7 Sheets—Sheet 3.

F. A. FELDKAMP.
DYNAMO ELECTRIC MACHINE.

No. 506,774. Patented Oct. 17, 1893.

WITNESSES:
Wm. H. Camfield Jr.
B. Mortimer Trusdell.

INVENTOR:
Fritz A. Feldkamp,
BY Fred. C. Fraentzel, ATT'Y.

(No Model.) 7 Sheets—Sheet 4.

F. A. FELDKAMP.
DYNAMO ELECTRIC MACHINE.

No. 506,774. Patented Oct. 17, 1893.

WITNESSES:
Wm. C. Camfield Jr.
B. Mortimer Truddell.

INVENTOR:
Fritz A. Feldkamp,
BY Fred C. Fraentzel, ATT'Y.

(No Model.) 7 Sheets—Sheet 5.

F. A. FELDKAMP.
DYNAMO ELECTRIC MACHINE.

No. 506,774. Patented Oct. 17, 1893.

WITNESSES: INVENTOR:
Fritz A. Feldkamp,
BY Fred H. Graentzel, ATT'Y.

(No Model.) 7 Sheets—Sheet 6.

F. A. FELDKAMP.
DYNAMO ELECTRIC MACHINE.

No. 506,774. Patented Oct. 17, 1893.

WITNESSES: INVENTOR:
Fritz A. Feldkamp,
BY Fred C. Fraentzel, ATT'Y.

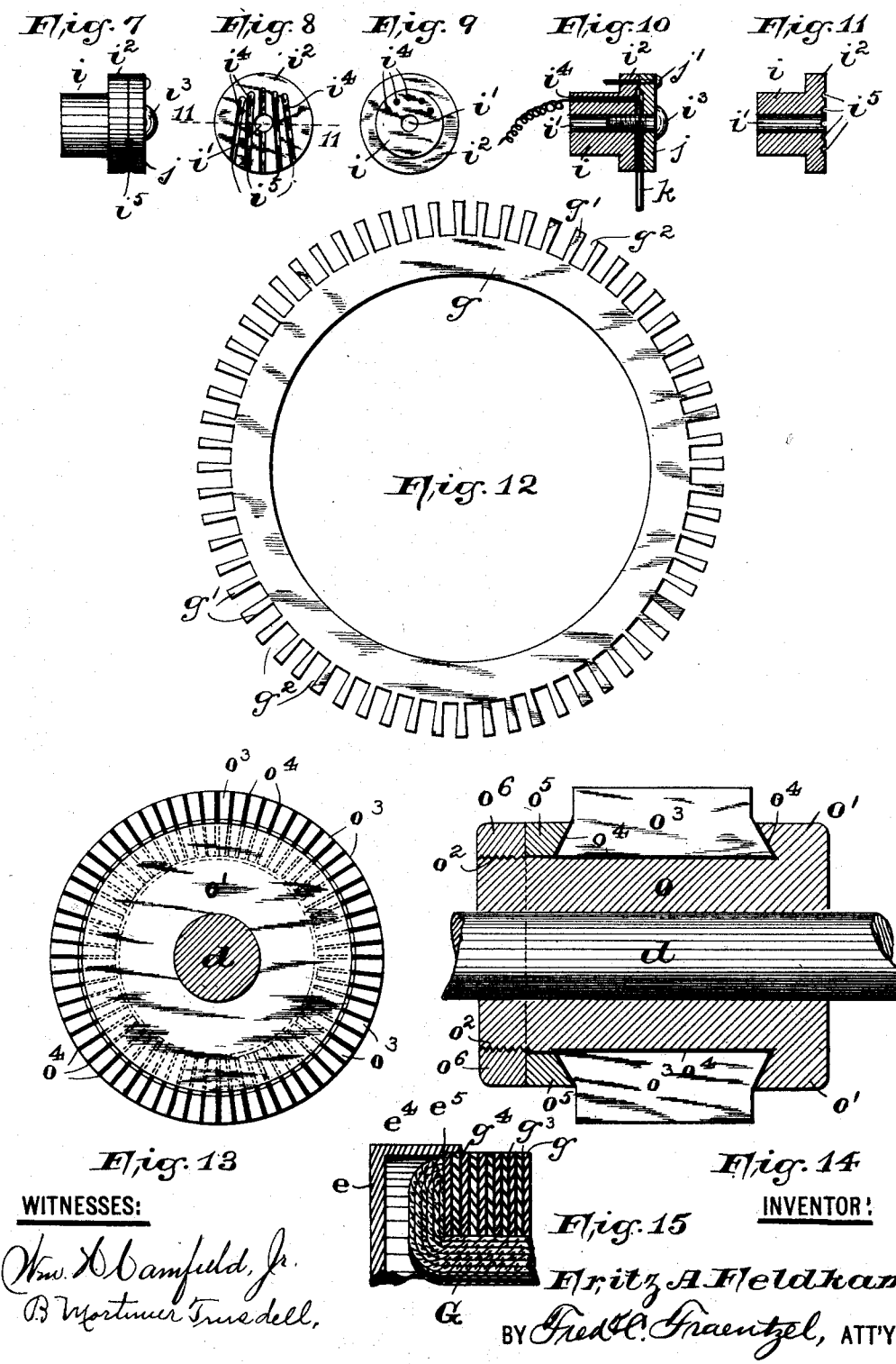

UNITED STATES PATENT OFFICE.

FRITZ A. FELDKAMP, OF NEWARK, NEW JERSEY.

DYNAMO-ELECTRIC MACHINE.

SPECIFICATION forming part of Letters Patent No. 506,774, dated October 17, 1893.

Application filed November 15, 1892. Serial No. 452,026. (No model.)

*To all whom it may concern:*

Be it known that I, FRITZ A. FELDKAMP, a subject of the Emperor of Germany, residing at Newark, in the county of Essex and State of New Jersey, have invented certain new and useful Improvements in Dynamo-Electric Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to improvements in dynamo-electric machines, and the invention has for its principal object to so construct the frame of the dynamo-electric machine and to so arrange the several parts of the machine, that its construction will be economical and simple and the machine itself efficient.

The invention has for a further object to arrange the magnets in such a manner that the magnetic poles of the two adjacent magnets will become equally magnetized, the directions of the magnetic lines of force being very short and rendering the magnets very powerful, and the magnets being arranged in such a manner to the supporting frame that all magnetic force must pass through the armature.

The invention has for a further object to provide a novel means for connecting the armature with the commutator, and the novel means of securing the armature to the shaft, to produce a perfectly true running armature, and one better ventilated, the construction being such that the wires are fully protected against damage from the outside.

The invention, furthermore, consists of the dynamo electric machine herein described, and certain arrangements and combinations of parts, such as will be hereinafter more fully described and finally embodied in the clauses of the claim.

Figure 2:
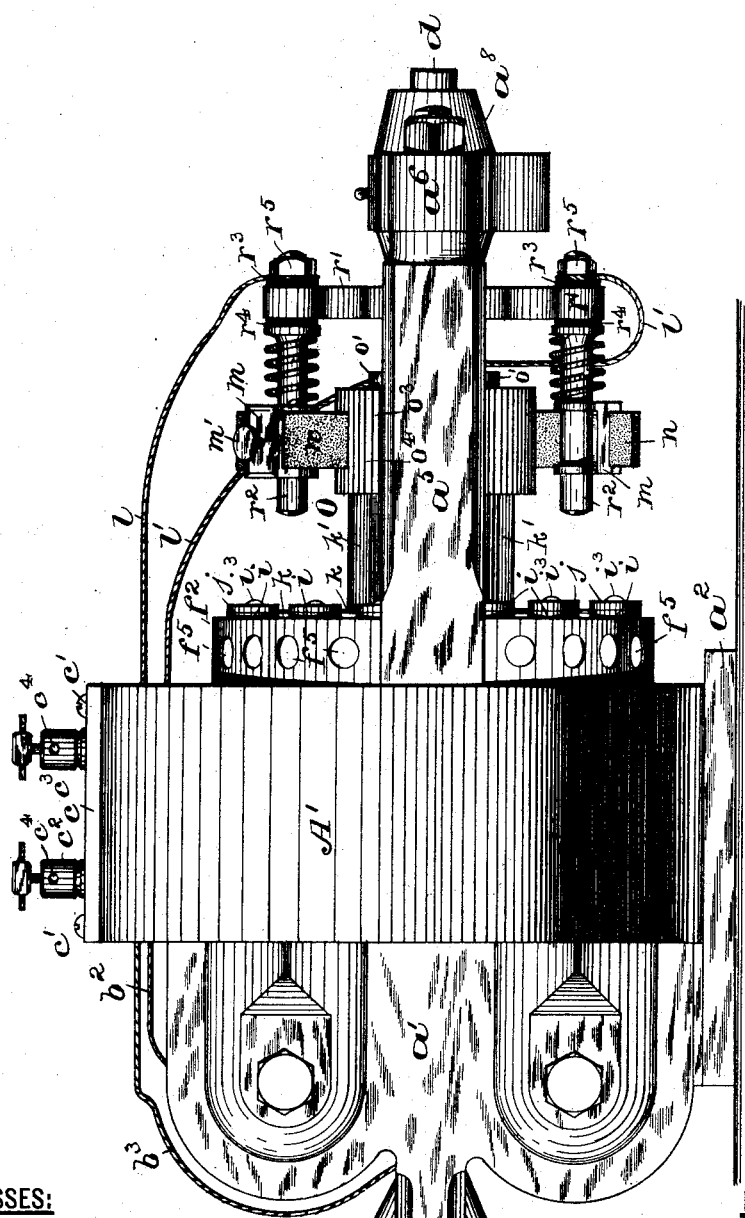
Figure 3:
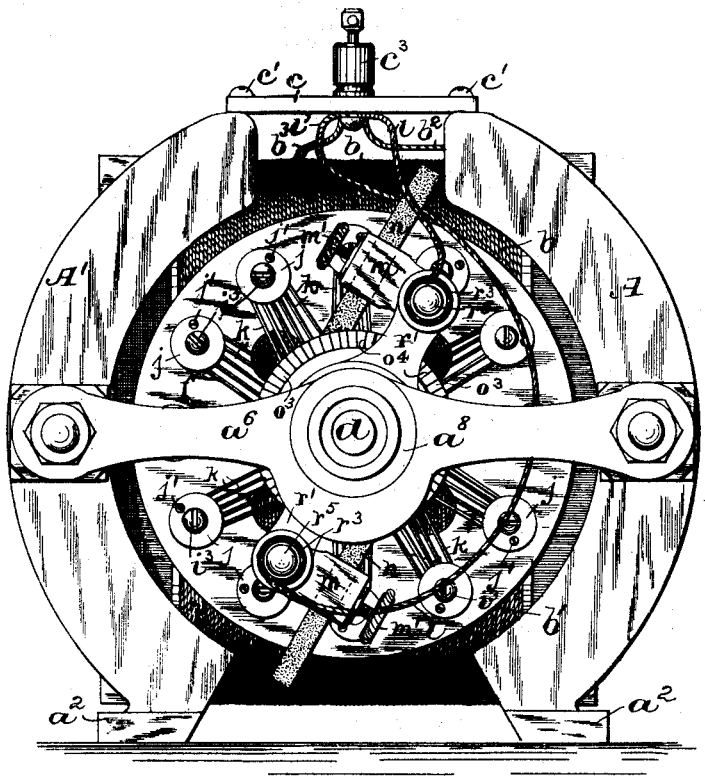
Figure 4:
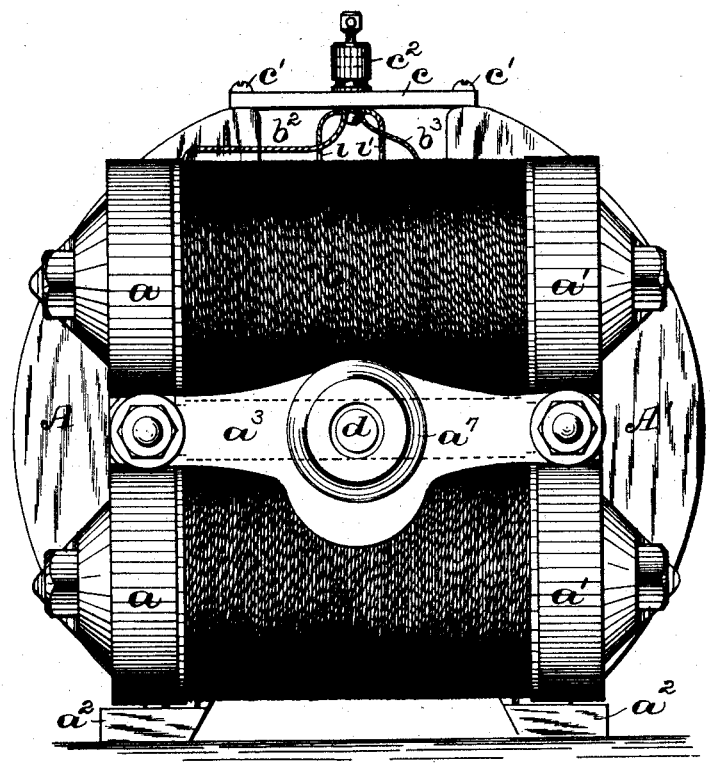
Figure 5:
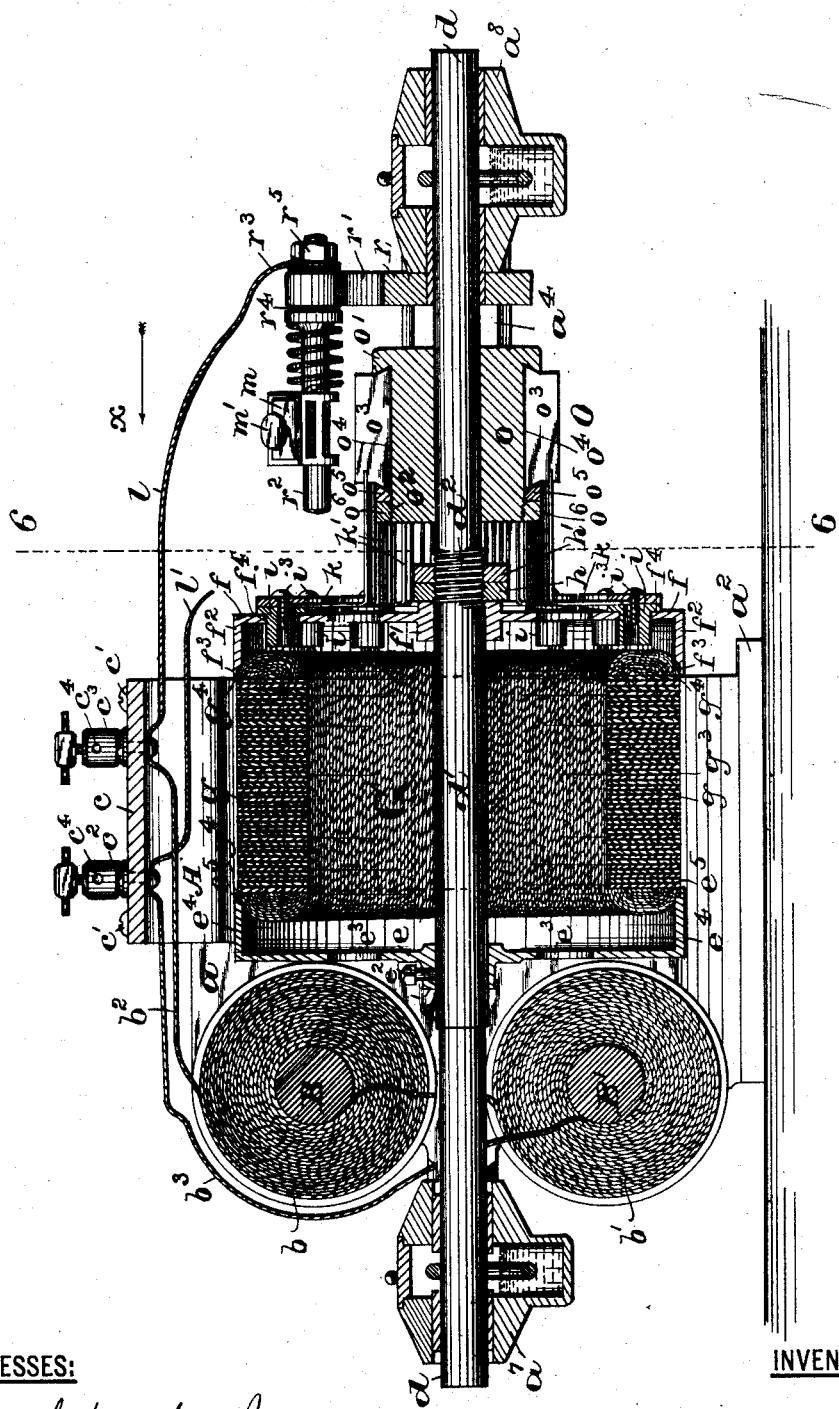
Figure 6:
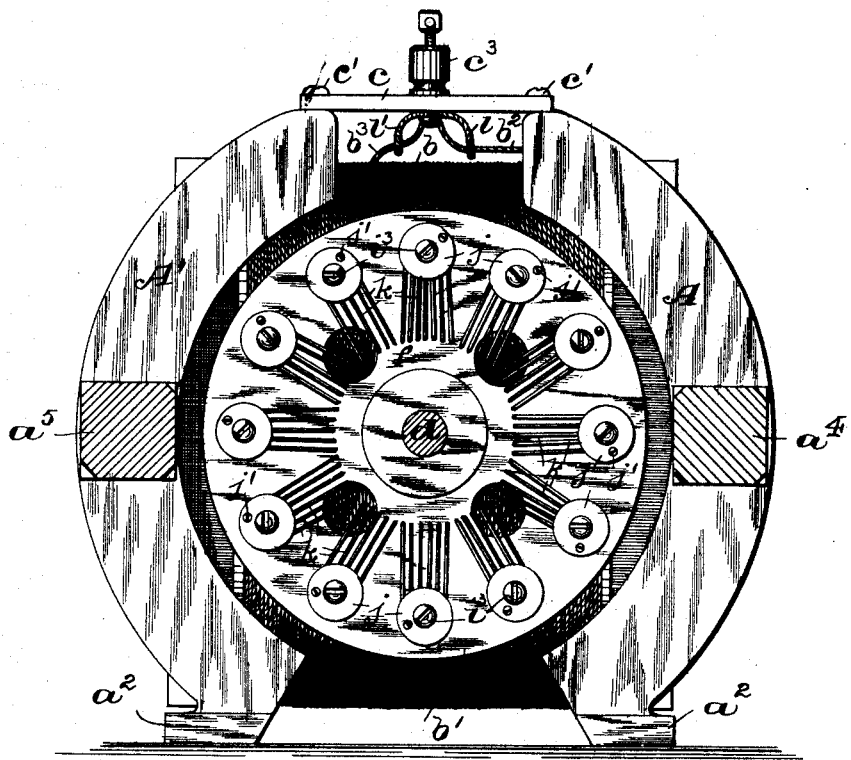

In the drawings herewith accompanying, in which similar letters of reference are employed to indicate corresponding parts in each of the several views:—Figure 1 is a plan or top view of my improved form of dynamo electric machine. Fig. 2 is a side view of the same; and Figs. 3 and 4 are the two respective end views of the machine. Fig. 5 is a longitudinal vertical section of the machine; and Fig. 6 is a vertical cross section taken on line 6—6 in said Fig. 5, looking in the direction of arrow $x$. Figs. 7, 8, 9, 10 and 11, are several detail views of certain insulating devices adapted to be secured in one side of the armature frame, and in which certain connecting wires or rods to the commutator are secured. Fig. 12 is a face view of one form of armature ring employed. Fig. 13 is an end view of the commutator and Fig. 14 is a vertical longitudinal section of the same. Fig. 15 is a vertical section of part of the armature frame and the armature rings and the wire coils wound thereon, to more clearly illustrate the manner of arranging the parts.

As will be seen from the drawings herein above described, I employ two stationary and horizontal magnets $b$ and $b'$, secured between the outwardly extending supporting plates or pieces $a$ and $a'$ projecting at right angles from the standards A and A' of the machine. Each standard is provided at the bottom with a foot piece $a^2$ and at the top they are connected by means of a non-magnetic or fiber plate $c$, which is secured to said standards by means of screws $c'$. The supporting plates or pieces $a$ and $a'$ are connected by means of a yoke or cross bar $a^3$ of non-magnetic metal and from the opposite sides of said standards A and A' extend the arms $a^4$ and $a^5$ respectively, which are connected at their free ends by means of a yoke or cross-bar $a^6$ also of non-magnetic metal, and in said yokes or cross-bars $a^3$ and $a^6$ are arranged suitable bearings $a^7$ and $a^8$ respectively in which the armature shaft $d$ revolves. Said standards A and A' are suitably curved on their inner sides, as is clearly illustrated in Figs. 3 and 6, and within said space thus formed is arranged the armature.

As will be seen, more especially from Fig. 5, the armature shaft $d$ is provided with a central portion $d'$ which is of a slightly increased diameter and may be provided with a screw-threaded portion $d^2$. At or near the one end of said enlarged portion $d'$ of the shaft $d$ is secured an armature plate $e$. Said plate is provided with a hub $e'$ and a set screw $e^2$ for firmly securing it on the armature shaft $d$, as shown, and is provided with the openings or holes $e^3$ for ventilation. Said armature plate is also provided with a peripheral flange $e^4$ having an annular recess or cut-away portion $e^5$, substantially as shown in said Fig. 5 and in Fig. 15. At the opposite end of said enlarged portion $d'$ of the shaft $d$, is a second armature plate $f$ provided with a hub $f'$. Said plate $f$ is also provided with a peripheral flange $f^2$ having an annular recess or cut-away portion $f^3$, and the said plate is provided with openings $f^4$ in the face of the plate and holes or openings $f^5$ in the peripheral flange $f^2$.

The armature G is made up of a suitable number of rings $g$, preferably formed as shown in Fig. 12, which rings are provided with outwardly projecting tooth-like portions $g'$ forming the open spaces $g^2$. As will be seen from Figs. 5 and 15, said rings $g$ are separated one from the other by means of a suitable non-conducting material $g^3$, such as paper, and the armature wire is wound around the adjacent rings $g$ lengthwise, until the open spaces $g^2$ are nearly filled thus leaving the projecting ends $g^4$ of the rings $g$. These projecting ends $g^4$ of the first and last armature rings fit snugly within the recessed or cut-away portions $e^5$ and $f^3$ of the armature plates $e$ and $f$ respectively, and the armature G can thus be firmly held in position without the least possible danger of displacement, when the nut $h$ on the screw-threaded portion $d^2$ on the shaft $d$ is tightly screwed against the hub $f'$ of the plate $f$, thereby causing said recessed portions $e^5$ and $f^3$ to firmly embrace the circumferential edges of the two outer rings $g$ of the armature G. A second nut $h'$ may be used on said screw-threaded portion $d^2$ to act as a lock nut against the nut $h$. As will be seen from the several figures of the drawings, within said openings or holes $f^4$ in the armature plate $f$ are placed suitable insulators $i$, which are made of fiber. Said insulators $i$, as will be seen from Figs. 7, 8, 9, 10 and 11, are each formed with a central hole $i'$ and at one end with a surrounding flange $i^2$ to which is secured by means of a screw $i^3$ a plate or cover $j$. A small screw $j'$ is employed for securing these insulators in their proper positions in the holes or openings $f^4$ in the armature plate $f$. Each insulator $i$ is also provided with a series of longitudinal holes $i^4$ and the grooves $i^5$, as will be seen from said Figs. 8, 9, 10 and 11. Within the grooves $i^5$ are placed certain wire-like rods $k$ which are firmly held in place when the plate or cover $j$ is secured in position by the screws $i^3$ and $j'$.

The projecting ends of the several sections of armature coils, see Fig. 5, are passed through the longitudinal holes $i^4$ in the insulators $i$ and are connected with the ends of the rods $k$ in said insulators, as will be seen from Fig. 10. Said rods $k$ are each of them provided with a bent portion $k'$, the free end of each bent portion being secured in the end of a commutator section, as will be clearly seen from Figs. 1 and 5. Thus a very firm and secure connection is established between each commutator section and the armature coils, which can not possibly become disarranged, as there are no loose wires projecting from the face of the armature plate $f$, and the wires can not become entangled with each other or with the armature shaft $d$, as in machines as heretofore constructed. Furthermore when the armature is once secured in position by means of the plates $e$ and $f$, it will run perfectly true, and cause a constant and even distribution of electricity, and furthermore, owing to the flanges $e^4$ and $f^2$ and the cover or plate $c$, the armature wires are entirely protected against injury from the outside. The wire coils around the armature rings are wound in the usual and proper manner so as to form a complete circuit through the several coils and the dangling ends of the wire coils thus formed are each connected with the wire-like rods $k$ secured to the commutator sections and in the grooves in said insulators $i$. The hollow armature thus formed is firmly secured between the armature plates $e$ and $f$ in the manner herein above described, said plates making a secure and true support for the armature on the armature shaft $d$, and thereby avoiding the use of insulated bolts and nuts for securing the parts together.

Upon the end of the armature shaft may be arranged the usual form of pulley, not shown in the drawings herewith.

Secured to the inner portion of the bearing on the yoke or cross bar $a^6$ and loosely arranged on the shaft $d$, is a suitable frame $r$ provided with two oppositely extending arms $r'$ provided at their extreme ends with eyes for the reception of the brush holders $r^2$. Said arms or brush holders are insulated from the arms $r$ by means of disks $r^3$ and $r^4$, and secured thereto are the wires $l$ and $l'$, the whole being firmly secured in position by the nuts $r^5$. Upon the free ends of said brush holder $r^2$ are arranged suitable spring-actuated clamping devices $m$ in which are adjustably secured by means of thumb-screws $m'$, carbon pencils or other suitable brushes $n$, as will be clearly seen from Figs. 1, 2 and 5. Beneath said brushes and secured to the shaft $d$ is any suitable form of commutator O. The commutator herein shown consists essentially of a body portion or core $o$ provided with an undercut flange or rim $o'$ and a screw-thread $o^2$ at its opposite end. Upon the peripheral surface of said core $o$, I arrange the copper commutator sections $o^3$, which are suitably insulated one from the other and from the core by means of the non-conducting material $o^4$, as will be seen more especially from Figs. 13 and 14. Said sections $o^3$ are held in place by means of the undercut flange or rim $o'$ on the core $o$ and an undercut ring $o^5$ fitting upon said core, the several parts of the commutator being firmly held together by screwing a ring $o^6$ upon the screw-threaded end of the core $o$ and against the ring $o^5$.

The wire connections are as follows:—The two field magnets $b$ and $b'$ are connected by means of the connecting wire shown in Fig. 5, said wire being the continuation of the coil of wire on the one magnet to the coil of wire on the second magnet, and from each magnet extend the wires $b^2$ and $b^3$ which are attached to the binding posts $c^2$ and $c^3$ respectively on the plate $c$. The wires $l$ and $l'$ hereinbefore mentioned, which are attached to said brush-holders $r^2$ are also connected with these binding posts $c^2$ and $c^3$, as will be clearly seen from said Fig. 5. The said binding posts are also provided with perforations in which the ends of the main wires may be arranged and secured in position therein by the binding screws $c^4$, as will be clearly understood.

By my improved form of dynamo electric machine, and the construction and arrangement of the several parts thereof, I have constructed a machine of very simple construction and one, in which by the arrangement of the magnets, the positive poles of the two magnets are both on the same side of the machine, while the negative poles of the magnets are both on the opposite side of the machine, whereby the magnetic lines of force are very short, passing from the magnetic cores B and B', at their positive ends through the standards A and A' respectively and back into the cores B and B' at their negative pole ends, thereby rendering the magnets very powerful and causing all the magnetic force to pass into the armature, and thereby producing a machine in which there is the least possible magnetic resistance, when constructed in this manner.

By the use of my improved form of hollow armature and the perforated plates $e$ and $f$, I provide for a free circulation of air around the armature shaft, thus keeping the machine perfectly cool while running.

Of course it will be evident that certain arrangements and details of construction of the machine herein described may be altered without departing from the scope of my present invention.

Having thus described my invention, what I claim is—

1. In a dynamo electric machine, the iron standards A and A', provided with the supporting plates or pieces $a$ and $a'$ formed at and extending from one side of said standards stationary magnets $b$ and $b'$ arranged one above the other and connecting said supporting plates, said standards being outwardly curved, and an armature rotating between said standards, and between said magnets substantially as and for the purposes set forth.

2. In a dynamo electric machine, the iron standards A and A', provided with supporting plates or pieces $a$ and $a'$ extending therefrom, stationary magnets $b$ and $b'$ connecting said supporting plates or pieces, said standards being outwardly curved, an armature shaft rotating between said magnets, and a hollow armature on said shaft, comprising therein the armature G proper, armature plates $e$ and $f$, provided with flanges $e^4$ and $f^2$ having annular recesses $e^5$ and $f^3$ respectively, between which the outer circumferential edge of the armature G is clamped and held, substantially as and for the purposes set forth.

3. In a dynamo electric machine, in combination with the armature G and the armature shaft, of armature plates $e$ and $f$ for arranging said armature on the shaft, one of said armature plates having insulators $i$ therein in which the free ends of the wire coils of the armature terminate, wire-like rods $k$ secured in said insulators and connected with said wire coils at the one end and at their free ends with the commutator, substantially as and for the purposes set forth.

4. In a dynamo electric machine, in combination with the armature G, comprising therein the insulated rings $g$ on which the wire is wound, having the peripheral projections $g^4$, of the armature shaft, and plates $e$ and $f$ provided with flanges $e^4$ and $f^2$ having annular recessed portions $e^5$ and $f^3$ into which the peripheral projections $g^4$ of the armature fit, and means on said shaft for drawing said plates close together and clamping the armature between them, substantially as and for the purposes set forth.

5. In a dynamo electric machine, in combination with the armature G, comprising therein the insulated rings $g$ on which the wire is wound, having the peripheral projections $g^4$, of the armature shaft, and plates $e$ and $f$ provided with flanges $e^4$ and $f^2$ having annular recessed portions $e^5$ and $f^3$ into which the peripheral projections $g^4$ of the armature fit, and means on said shaft for drawing said plates close together and clamping the armature between them, said means consisting essentially of a screw-threaded portion $d^2$ on the shaft and a nut or nuts adapted to be tightened up thereon, substantially as and for the purposes set forth.

6. In a dynamo electric machine, in combination with the armature G, comprising therein the insulated rings $g$ on which the wire is wound, having the peripheral projections $g^4$, of the armature shaft, and plates $e$ and $f$ provided with flanges $e^4$ and $f^2$ having annular recessed portions $e^5$ and $f^3$ into which the peripheral projections $g^4$ of the armature fit, means on said shaft for drawing said plates close together and clamping the armature between them, insulators $i$ secured in holes $f^4$ in said plate $f$, said insulators being provided with holes $i^4$ in which the wire ends from the armature coils terminate, and having grooves $i^5$, and a cover $j$, and wire-like rods $k$ in said grooves connected with the armature wires and with the commutator, substantially as and for the purposes set forth.

7. The herein described insulating devices $i$, provided with holes $i^4$ for the ends of the armature wires, provided with a flange $i^2$ and a plate $j$ secured thereto, and grooves $i^5$ in said insulating devices for securing the wire-like rods $k$ therein, substantially as and for the purpose set forth.

In testimony that I claim the invention set forth above I have hereunto set my hand in the presence of two subscribing witnesses.

FRITZ A. FELDKAMP.

Witnesses:
   FREDK. C. FRAENTZEL,
   WM. H. CAMFIELD, Jr.